United States Patent

Visser et al.

[11] Patent Number: 5,841,575
[45] Date of Patent: Nov. 24, 1998

[54] TELESCOPE WITH A LARGE FIELD OF VISION

[75] Inventors: Huib Visser, Zevenhuizen; Bart Snijders, Rotterdam, both of Netherlands

[73] Assignee: Nederlandse Organisatie Voor Toegepast-Natuurwetenschappelijk Onderzoek (TNO), Delft, Netherlands

[21] Appl. No.: 773,517

[22] Filed: Dec. 23, 1996

[30] Foreign Application Priority Data

Dec. 21, 1995 [NL] Netherlands ............... 1001952

[51] Int. Cl.$^6$ ............... G02B 5/10; G02B 17/06; G02B 23/02
[52] U.S. Cl. ............... 359/365; 359/364
[58] Field of Search ............... 359/364, 365, 359/366, 126, 727, 730, 739, 857, 858, 859, 861

[56] References Cited

U.S. PATENT DOCUMENTS

| | | | |
|---|---|---|---|
| 2,697,379 | 12/1954 | Walker | 359/365 |
| 2,869,423 | 1/1959 | Hoge et al. | 359/858 |
| 2,970,518 | 2/1961 | Ross | 359/859 |
| 3,353,893 | 11/1967 | Bamberger et al. | 359/858 |
| 3,811,749 | 5/1974 | Abel | 359/858 |
| 4,265,510 | 5/1981 | Cook . | |
| 4,443,058 | 4/1984 | Bosserman | 359/858 |
| 4,598,981 | 7/1986 | Hallam et al. . | |
| 4,733,955 | 3/1988 | Cook . | |
| 4,773,756 | 9/1988 | Blechinger . | |
| 4,927,256 | 5/1990 | Lacuve | 59/365 |
| 5,153,772 | 10/1992 | Kathman et al. | 359/364 |
| 5,231,462 | 7/1993 | Dschen | 356/328 |
| 5,287,218 | 2/1994 | Chen | 359/858 |
| 5,477,395 | 12/1995 | Cook | 359/861 |

FOREIGN PATENT DOCUMENTS 0 129 289  12/1984  European Pat. Off. .
329088  of 1903  United Kingdom ............... 359/858

*Primary Examiner*—Rickey D. Shafer
*Attorney, Agent, or Firm*—Young & Thompson

[57] ABSTRACT

Telescope comprising two or more reflecting elements, wherein a light beam impinging on a first reflecting element leaves through a second reflecting element, in which the shape of the reflecting surface of the second reflecting element is concave. The shape of the reflecting surface of the first reflecting element is concave. An entrance pupil is arranged in the light path in front of the first reflecting element and the first reflecting element images the entrance pupil nearly in the focus of the second reflecting element.

7 Claims, 2 Drawing Sheets

TELESCOPE WITH A LARGE FIELD OF VISION

BACKGROUND OF THE INVENTION

The invention relates to a telescope comprising two or more reflecting elements, in which a light beam impinging on a first reflecting element leaves through a second reflecting element, in which the shape of the reflecting surface of the second reflecting element is concave.

Such a telescope could be placed in practice for example in front of an imaging spectrometer for imaging an object at its entrance slot. The combination of imaging spectrometer and telescope could be provided for example in a satellite or an aeroplane and could be used for example for chartering or monitoring the ozone layer.

DESCRIPTION OF THE RELATED ART

A telescope of the type mentioned at the beginning is known from DE-A-3614639. The known telescope consists of a first convex and a second concave mirror and has advantageous relatively small dimensions. However, the known telescope has the disadvantage that its field of vision is limited. In the above mentioned application this results for example in a satellite, which must revolve many times around the earth for covering a predetermined area of the ozone layer.

SUMMARY OF THE INVENTION

This invention has the object to provide a telescope of the type mentioned above having comparable dimensions but having a larger field of vision.

The telescope according to this invention is therefore characterized in that the shape of the reflecting surface of the first reflecting element is concave, that an entrance pupil is located in the light path in front of the first reflecting element and that the first reflecting element images the entrance pupil approximately in the focus of the second reflecting element.

Moreover, the telescope according to the invention has the advantage that the light beam impinging on the telescope leaves nearly parallel to each other. Therefore, the outgoing light beams will impinge nearly perpendicular to the entrance slot of a spectrometer located in use behind the telescope. Consequently, the telescope according to the invention is suitable for using it in nearly all of the known spectrometers. Because of said nearly perpendicular incidence of the light beams the telescope according to the invention may also be used in combination with a spectrometer having small dimensions. Thereby no additional elements are required for diminishing the angle of incidence of such a spectrometer. The possibility of using a small spectrometer is particularly advantageous in the above mentioned implementation because of the small available space in a satellite or aeroplane.

BRIEF DESCRIPTION OF THE INVENTION

This invention will be described in more details by reference to the accompanying drawings, in which FIG. 1 shows a side view of a preferable embodiment of the telescope according to the invention;

FIG. 2 shows a plane view of the preferable embodiment of FIG. 1.

DESCRIPTION OF THE PREFERRED EMBODIMENTS

In both of the figures similar elements are indicated by equal reference numbers.

Figure 1:
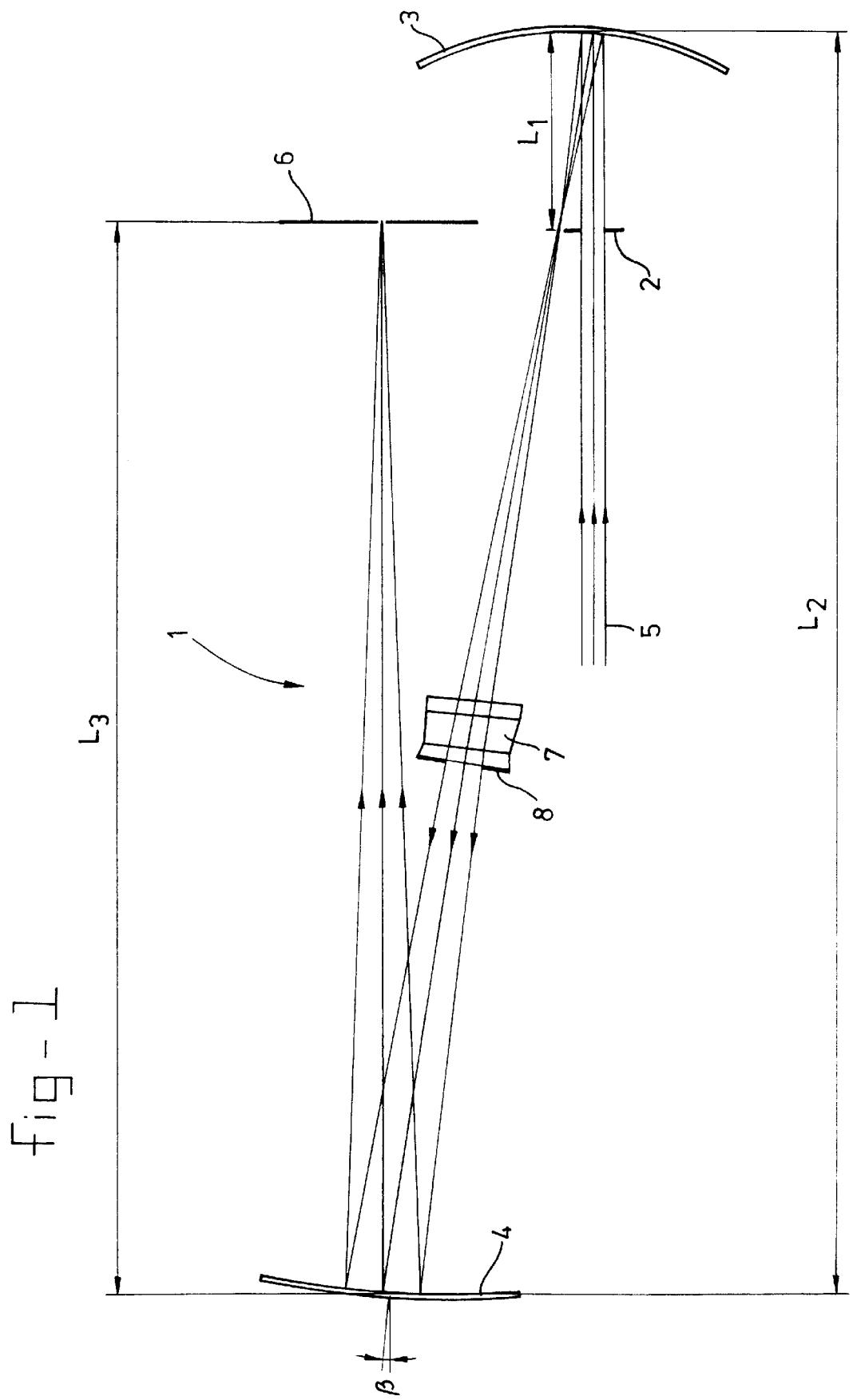

FIG. 1 shows a side view of a preferable embodiment of the telescope according to the invention. In the shown embodiment the telescope 1 comprises an entrance pupil 2, a first reflecting element 3 and a second reflecting element 4. The shape of the reflecting surface of the reflecting elements 3 and 4 is concave. A light beam 5 impinging on the telescope passes successively the entrance pupil 2, the first reflecting element 3 and the second reflecting element 4. The construction of the telescope 1 is such that the first reflecting element 3 images the entrance pupil 2 approximately in the focus of the second reflecting element 4. This has the advantage that all of the impinging light beams leave the telescope nearly parallel to each other. The outgoing light beams 5 impinge thus also nearly perpendicular on a spectrometer located in use after the telescope, of which only the entrance slot 6 is shown. This facilitates the use of the telescope according to the invention in combination with a spectrometer having small dimensions. By said nearly perpendicular incidence of the light beams on such a spectrometer also a sufficient image of the object to be tested could be formed at the entrance slot of a relatively small spectrometer after all. Furthermore, the telescope 1 provides an image of the object on the spectrometer in a nearly straight image plane in contrast to the known telescope resulting in a curved image plane. In view of the above mentioned description it will be clear that the telescope according to the invention is suitable for using it in combination with practically all known imaging spectrometers.

Figure 2:
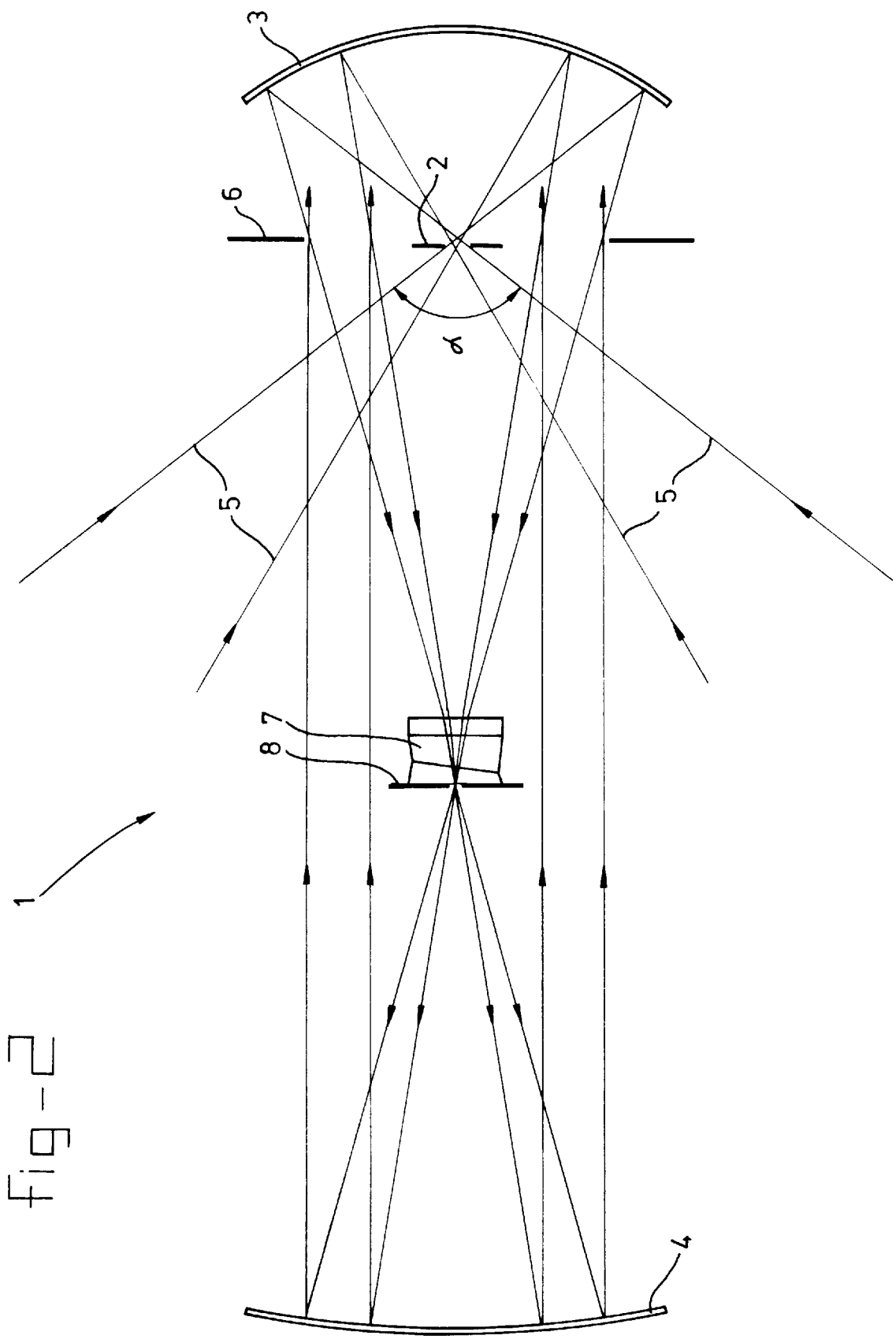

FIG. 2 shows a plan view of the preferable embodiment of FIG. 1. The angle $\alpha$ is a measure for the field of vision of the telescope 1. In the shown embodiment the telescope 1 has an angle $\alpha \geq 90$ degrees. In contrast $\alpha \leq 30$ degrees is valid for the known telescope. The telescope according to the invention results thus in a substantial improvement in field of vision in comparison to the known telescope. With the shown preferable embodiment the telescope according to the invention has, just like the known telescope, in addition the advantage of relatively smaller dimensions, which will be explained later.

In the known preferable embodiment the reflecting elements 3 and 4 are mirrors. The reflecting surface of the mirrors may be both spherical and aspherical in shape. Because of its simple manufacturing the use of mirrors with spherical surfaces is preferred. It will be clear for one skilled in the art that dependent on the aimed application many kinds of materials are suited for the reflecting surfaces. Examples of suitable materials are aluminum, optical glass types and materials with a partly amorphous and a partly crystalline structure such as Zerodur®. Preferable both of the mirrors have an angle of inclination $\beta$ approximately lying between 0 and 25 degrees. In the known preferred embodiment the radius of curvature of the mirror 3 is nearly 60.3 mm. The radius of curvature of mirror 4 is nearly 195 mm. In order to minimize light scattering the reflecting surfaces of the mirrors 3 and 4 are preferably polished.

Entrance pupil 2 may comprise all kinds of light absorbing materials. The entrance pupil has preferably an electrical opening of approximately 6.4 mm by 3.3 mm. In the shown embodiment the entrance pupil is positioned horizontally with the long axis seen in the plane of FIG. 2.

In the shown preferable embodiment the entrance pupil 2 is located at a distance 11 of approximately 37 mm as to mirror 3. Mirrors 3 and 4 are spaced at a mutual distance 12 of approximately 230 mm. Mirror 4 is arranged at a distance 13 of nearly 190.4 mm from the entrance slot 6 of the spectrometer. For a good operation of the telescope 1 an accuracy of at least 1% and more preferably 0.2% is preferably valid for all of the distances and radii of curvature.

It is self-evident that the mentioned dimensions are only illustrative and are by no means meant to limit the invention. The dimensions illustrate indeed the handy size of the preferred embodiment of the telescope according to the invention. This handy size is substantially advantageous, in particular in locating the telescope in a satellite or aeroplane, such as in the above described application in an Ozone Monitoring Instrument. The mentioned dimensions indicate further only in proportions the mutual distances and sizes of the components in the shown configuration. If desired the whole configuration could be upscaled by a predetermined factor. Thereby the large field of vision is maintained.

Optionally a depolarizer 7 could be inserted in the light path between mirrors 3 and 4. In this way the telescope according to the invention is favorably made polarization independent. This is also true for any instrument located thereafter, such as the spectrometer. Depolarizer 7 is built up preferably in a known way from four wedges from quartz crystal.

Moreover, a diaphragm 8 may be arranged behind depolarizer 7 for optimizing the operation of the telescope further. Preferably, diaphragm 8 is located nearly in the focus of the second mirror 4. The opening of the diaphragm 8 is preferably smaller than the image of the entrance pupil 2 at the location of the diaphragm. The quantity of scattering light is minimized by means of diaphragm 8. In addition the diaphragm serves that the transmitted quantity of light for all of the angles of vision are nearly equal. Diaphragm 8 is preferably manufactured from light absorbing material.

Without any doubt many embodiments and modifications of the described telescope will appear to those skilled in the art. The telescope according to the invention may be implemented for example with lenses instead of mirrors. The use of lenses, however, has the disadvantage that so called "color errors" will occur. This means among others that it is difficult feasible with lenses to image light of different wavelengths with an equal spot size.

The telescope according to the invention is naturally not limited to the described and illustrated embodiment, but comprises any embodiment being consistent with the above description and the enclosed drawings and being with the scope of the enclosed claims.

We claim:

1. A telescope comprising:
    a first reflecting element and a second reflecting element, in which a light beam impinging on the first reflecting element is reflected to and then reflected from the second reflecting element, and in which the first and second reflecting elements have concave reflecting surfaces; and
    an aperture stop, comprised of a first diaphragm positioned between the first and second reflecting elements substantially in a focus of the second reflecting element; wherein an angle of inclination and a radius of curvature of the first and second reflecting elements are such that the telescope has a field of vision wider than 30 degrees in one direction.

2. The telescope of claim 1, wherein an entrance pupil is located in front of said first reflecting element in a light path of the light beam impinging on the first reflecting element.

3. The telescope of claim 2, wherein the reflecting surface of the first reflecting element has a radius of curvature of about 60.3 mm, the reflecting surface of the second reflecting element has a radius of curvature of about 195 mm, the distance between the entrance pupil and the first reflecting element is about 37 mm and the distance between the first and the second reflecting elements is about 230 mm.

4. The telescope of claim 7, wherein the angle of inclination of the optical axes of the first and second reflecting elements is less than approximately 25 degrees.

5. The telescope of claim 1, further comprising a depolarizer located in the light path between the first and second reflecting elements.

6. A telescope comprising:
    first and second reflecting elements having concave reflecting surfaces, in which a light beam impinging on the first reflecting element is reflected to and then reflected from the second reflecting element; and
    an entrance pupil located in the light path in front of the first reflecting element so that the focus of the second reflecting surface is intermediate the entrance pupil and the second reflecting surface;
    wherein the reflecting surface of the first reflecting element has a radius of curvature of about 60.3 mm, the reflecting surface of the second reflecting element has a radius of curvature of about 195 mm, the distance between the entrance pupil and the first reflecting element is approximately 37 mm, and the distance between the first and the second reflecting elements is approximately 230 mm.

7. The telescope of claim 6, wherein a depolarizer is located in a light path between the first and the second reflecting elements.

* * * * *